United States Patent [19]
Oglesbee

[11] Patent Number: 5,940,282
[45] Date of Patent: Aug. 17, 1999

[54] DUAL RANGE POWER SUPPLY AND ADAPTER FOR USE WITH SAME

[75] Inventor: John W. Oglesbee, Watkinsville, Ga.

[73] Assignee: Motorola, Inc., Schaumburg, Ill.

[21] Appl. No.: 09/017,033

[22] Filed: Feb. 2, 1998

[51] Int. Cl.$^6$ .......................... H02M 3/335; H02M 1/00
[52] U.S. Cl. .............................. 363/21; 363/146
[58] Field of Search .................... 363/210, 146; D13/107, 144; 439/638, 668

[56] References Cited

U.S. PATENT DOCUMENTS

| | | | |
|---|---|---|---|
| D. 300,626 | 4/1989 | Crutcher et al. | D13/28 |
| D. 318,648 | 7/1991 | Collins | D13/144 |
| 4,261,712 | 4/1981 | Kinkade | 363/142 |
| 4,999,752 | 3/1991 | Rogers et al. | 362/228 |
| 5,369,255 | 11/1994 | Sherer et al. | 219/725 |
| 5,414,610 | 5/1995 | Brainard | 363/21 |
| 5,602,726 | 2/1997 | Sakai | 363/21 |
| 5,744,934 | 4/1998 | Wu | 363/146 |
| 5,766,020 | 6/1998 | Hughes | 439/653 |

*Primary Examiner*—Peter S. Wong
*Assistant Examiner*—Rajnikant B. Patel
*Attorney, Agent, or Firm*—Felipe J. Farley

[57] ABSTRACT

A dual range power supply 200 is operable with either an AC line input, or a DC input. To facilitate use with an AC input the power supply is provided with a pair of AC prongs, connected to a rectifier bridge. The power supply is also provided with a positive DC receptacle. In using the power supply with a DC source, the power supply is connected to an adapter. The adapter has receptacle slots for receiving the AC prongs of the power supply, and a positive DC prong which mates with the positive DC receptacle of the power supply. Positive DC power is applied to the power supply through the positive DC receptacle while the DC return is through the rectifier bridge and at least one of the AC prongs.

13 Claims, 5 Drawing Sheets

DUAL RANGE POWER SUPPLY AND ADAPTER FOR USE WITH SAME

TECHNICAL FIELD

The invention relates in general to power supplies, and particularly to power supplies operable at both line AC levels and vehicular DC levels.

BACKGROUND OF THE INVENTION

Many electrical and electronic devices require a power supply for converting electrical voltage and current at given levels to levels usable by the device. One of the most common types of power supply is the so called wall mount transformer, which comprises a transformer circuit for converting an alternating current (AC) voltage at a commercial level, such as 120 volts AC, to a direct current (DC) level usable by the device. Indeed, such supplies are sold by the millions worldwide for devices that can work efficiently at a single output DC level. Typically these types of supplies use a simple step down transformer, appropriately designed, with a rectifier circuit on the output. Other types of devices, such as, for example, battery chargers and mobile computer power supplies, require output levels that may change during use, or that may be of such magnitude that the step down transformer approach results in a power supply that is too bulky for mobile applications.

In recent years there has been a drive towards mobility for electronic devices. This is especially true for communications devices such as cellular radio-telephones, and computing equipment such as laptop computers. In many instances the use of such equipment is desirable in automobiles, and as such, there are numerous accessories available that permit the use of a vehicular cigarette lighter socket to power these types of devices. However, in order to use both an AC source, and a DC source, the user of the device typically must purchase separate power supplies; one for use with an AC source, and one for use with a DC source. It would therefore be desirable to have a power supply that can operate from both AC and DC sources, thus relieving the burden of having to purchase and keep two different power supplies. Although a dual range power supply would be fairly simple to realize, to date there has not been a strong presence of such a power supply in the marketplace.

One reason that may account for the virtual absence of a dual range power supply for mobile equipment is a safety concern. Connectors for AC and DC power inputs are typically dissimilar, and therefore two connectors are used, one for each type of input. However, when operating the power supply from an AC source, it may be possible through some sort of equipment malfunction that the AC power becomes evident at a DC connector, and may pose a shock hazard. Furthermore, a hazard potential may exist if the user were able to provide both types of power simultaneously. That is, connecting to AC and a DC sources at the same time.

Therefore there exists a need for a dual range power supply operable from either an AC source or a DC source in a manner such that the simultaneous interconnection of the two different types of input is barred. In addition, the device must accommodate two very different types of electrical receptacles in order to be successfully utilized in both AC line powered and DC vehicular powered applications. Such a power supply would offer ease of use, mobility, and eliminate the safety concerns described above.

DETAILED DESCRIPTION OF A PREFERRED EMBODIMENT

Figure 1:
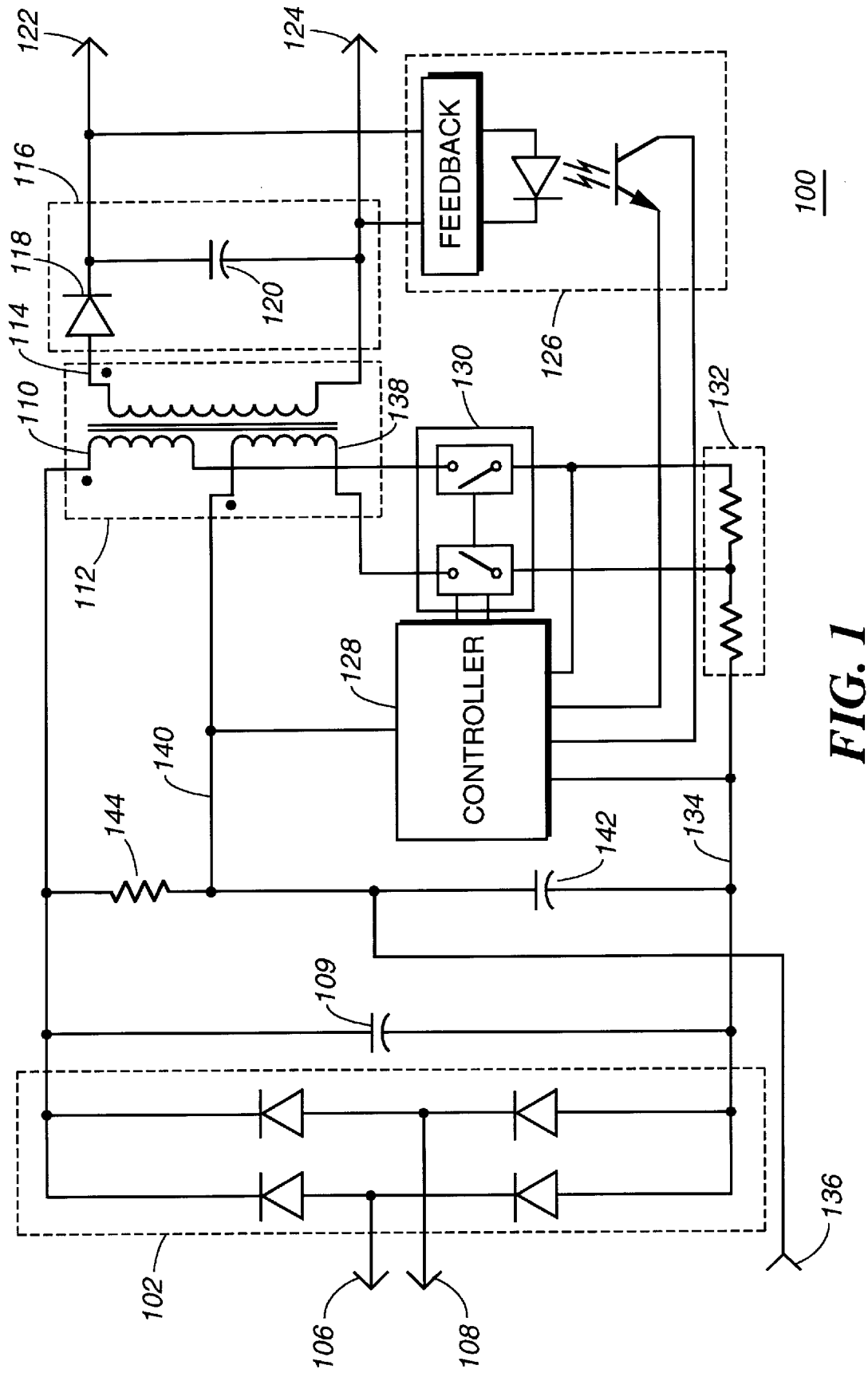
FIG. 1 shows an electrical schematic diagram of a power supply circuit for a dual range power supply in accordance with the invention.

While the specification concludes with claims defining the features of the invention that are regarded as novel, it is believed that the invention will be better understood from a consideration of the following description in conjunction with the drawing figures, in which like reference numerals are carried forward.

The invention solves the problem of having one power connector accessible while using a second by providing a conventional type AC dual blade or prong type connector, and an adapter, which also uses the AC connector, for use with a DC source. Referring now to FIG. 1, there is shown an electrical schematic diagram 100 of a power supply circuit for a dual range power supply in accordance with the invention. The dual range power supply is operable from either an AC source or a DC source. Briefly, the diagram shows an input section comprising a rectifier bridge 102 and a bulk filter capacitor 109, as is conventional. AC voltage is supplied to the input section by first and second AC prongs 106 and 108, used for connecting the dual range power supply to an AC source, and which are electrically coupled to the rectifier bridge in a conventional manner. Voltage from the input section is fed to a first primary winding 110 of a transformer 112. A secondary winding 114 provides voltage to a secondary rectifier circuit 116 comprising a diode 118 and a filter capacitor 120, and provides an output level between points 122 and 124. A feedback circuit 126 samples the output level, and provides a signal to a controller 128, in a conventional manner. The controller operates a switch circuit 130, to which the first primary winding is coupled, to generate an appropriate signal across the first primary winding. The controller samples the current through the switch circuit by use of a sense resistor network 132 disposed between the switch circuit and a reference line 134, which is connected to the first and second AC prongs through the rectifier bridge. Thus far the elements described are typically part of a conventional commercial AC level fed power supply.

For operating the power supply with a DC source, a positive DC connector, such as a positive DC receptacle 136 is provided, and is coupled to a second primary winding 138 via a DC power line 140. The second primary winding is for use when the power supply is operated from a DC source. The controller 128 is coupled to the DC power line 140, and voltage on the DC power line is filtered by a power capacitor 142. The positive DC connector is coupled to the DC power line. Power is directly applied to the DC power line either when a positive DC voltage level is applied to the positive DC connector which is connected to a power source, or through a bootstrap resistor 144 when the dual range power supply is connected to an AC source. However, rather than provide a negative DC connector, the DC return from the reference line 134 is through the AC prongs. That is, DC power is supplied through the positive DC connector, through the power supply to the reference line, through the rectifier bridge, and finally through the AC prongs. Since the AC prongs are used as the DC return, they are not left exposed when the power supply is operated from a DC source.

Figure 3:
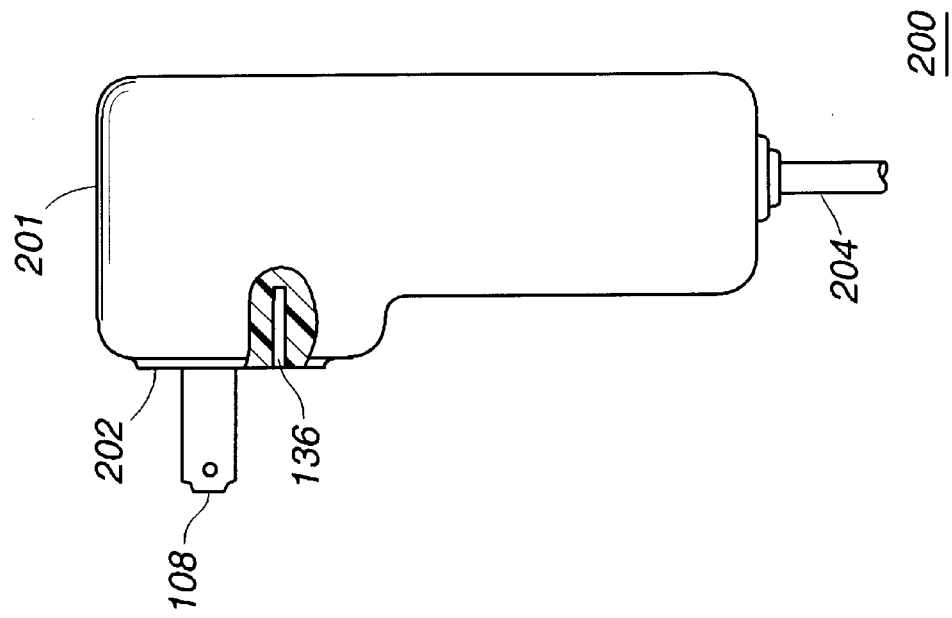
FIG. 3 shows a side view of a dual range power supply in accordance with the invention.
Figure 2:
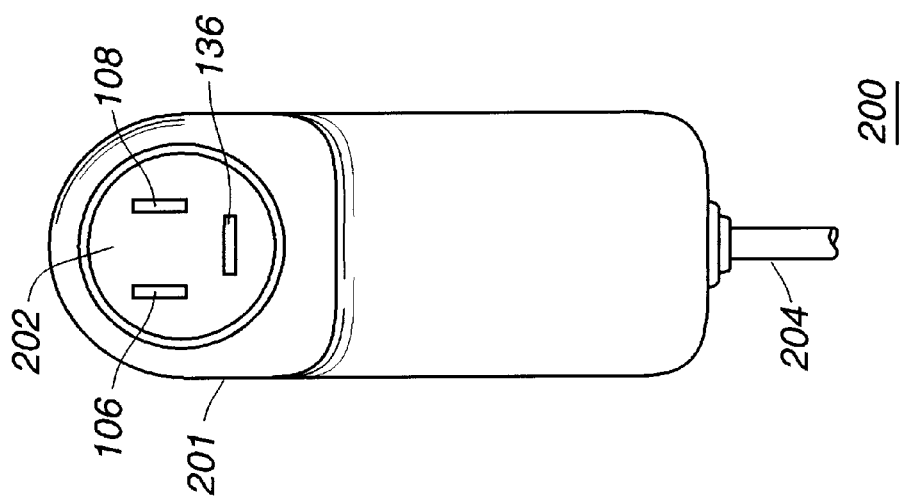
FIG. 2 shows a front view of a dual range power supply in accordance with the invention.

A better appreciation of how the power supply functions can be gained from a perusal of FIGS. 2–5 and the following description. Referring now to FIGS. 2 and 3, there is shown a front view and a side view, respectively, of a dual mode power supply 200 in accordance with the invention. The power supply comprises a body 201, preferably fabricated of an electrically insulative material, first and second AC prongs 106 and 108, and a positive DC receptacle 136. The first and second AC prongs and the positive DC receptacle may be disposed on a common face 202 of the power supply body. Mounted within the body is a power supply circuit in accordance with that shown and described in FIG. 1. The power supply provides a DC output to an associated device through, for example, a cable 204. However, since AC prongs are not suitable for use with a DC source, particularly a vehicular cigarette lighter socket, an adapter is necessary.

Figure 5:
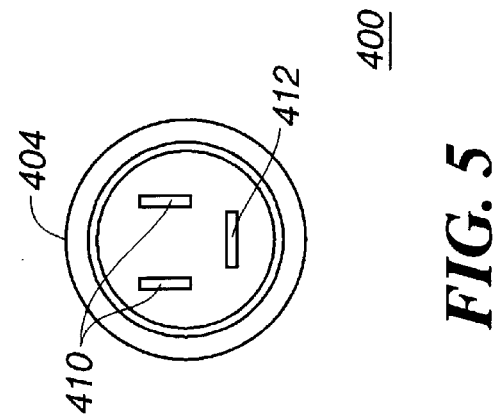
FIG. 5 shows a top view of an adapter for use with a dual range power supply, in accordance with the invention.
Figure 4:
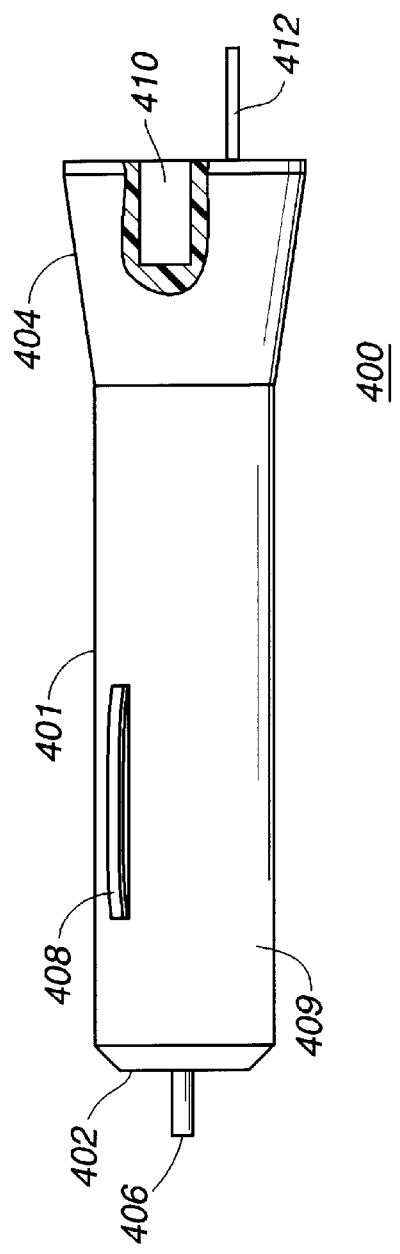
FIG. 4 shows a side view of an adapter for use with a dual range power supply, in accordance with the invention.

Referring now to FIGS. 4 and 5, there is shown a side view and a top view, respectively, of an adapter 400 for use with a dual mode power supply in accordance with one embodiment of the invention. The dual range power supply and adapter together comprise a dual range power supply system. In the preferred embodiment, the adapter comprises a cylindrical body 401, having a bottom 402, and a top 404, a positive electrode 406 disposed at the bottom, and a negative electrode 408 disposed on the side 409 of the cylindrical body. The positive and negative electrode function to make electrical contact with a DC source.

In the preferred embodiment, the cylindrical body is sized for insertion into a vehicular cigarette lighter socket, as is conventional. A pair of receptacles 410 are disposed on the top, and are sized and spaced for receiving the AC prongs of a power supply in accordance with that shown in FIGS. 2 and 3. The negative electrode is coupled to at least one of the AC receptacles. Furthermore, there is provided a positive DC prong 412, corresponding with the positive DC receptacle 136. The AC prongs and AC receptacles and positive DC prong and receptacle are oriented in a common direction so that the positive DC prong is received in the positive DC socket when the AC prongs are inserted into the AC receptacles, or in other words, when the power supply is plugged into the adapter. Thus, in practicing the invention, when operation from an AC source is used, the power supply is used in a conventional manner with the AC source; the AC prongs are sized and spaced conventionally to fit a commercial AC outlet. When the power supply is to be used with a DC voltage source, such as a vehicular cigarette socket, an adapter such as that shown in FIGS. 4 and 5 is used to connect to the DC source, and the power supply plugs into the adapter to make the DC connection necessary to operate the power supply.

Figure 6:
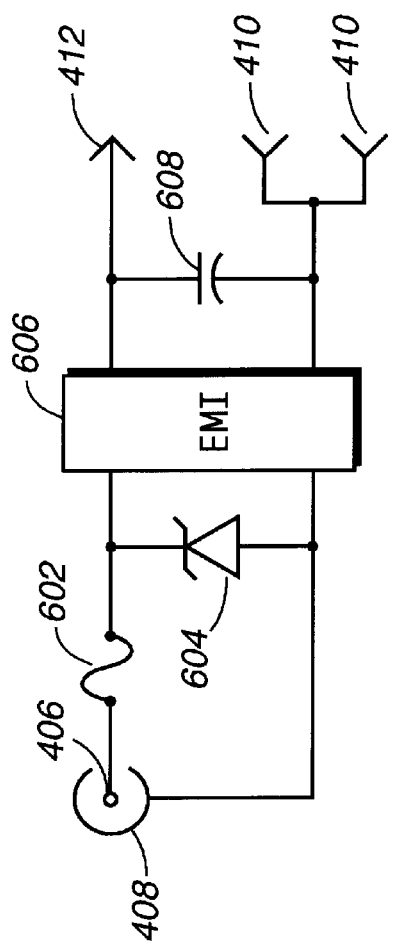
FIG. 6 shows an electrical schematic diagram of an adapter for use with a dual range power supply in accordance with the invention.

The adapter further comprises circuitry to realize the DC connection, as is shown in FIG. 6, an electrical diagram 600 of an adapter circuit in accordance with the invention. The positive electrode 406 is coupled to the positive DC prong 412, and, in the preferred embodiment, comprises a fuse 602 in line between the electrodes and the power supply, a transient zener 604 coupled in parallel with the electrodes, an electromagnetic interference (EMI) filter 606 coupled in parallel with the electrodes, and output capacitor 608 disposed across the positive DC connector and the AC receptacles. When the power supply is connected to the adapter, the DC return from the reference line 134 goes through the rectifier bridge, the AC prongs, and to the negative electrode of the adapter.

Thus, the invention solves the problem of having a device, such as a laptop computer, powered by a single power supply operable with either an AC source, or a DC source. Furthermore, the invention avoids the safety concern of having a connector for a first type of power source available while connected to the second by commonly orienting connectors for both, and preferably on a common face of the power supply, so as to make the connectors inaccessible when connected to either an AC source or a DC source.

Figure 7:
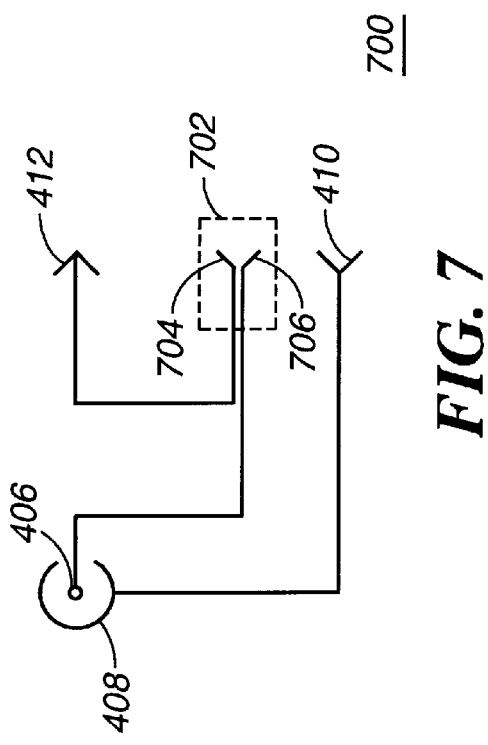
FIG. 7 shows an electrical schematic diagram of an alternative embodiment of an adapter for use with a dual range power supply in accordance with the invention.

To further enhance the safety of the adapter, an alternative embodiment is contemplated that prevents the electrification of the positive DC prong 412 until the AC prongs of the power supply are inserted into the AC receptacle slots. Referring now to FIG. 7, there is shown an electrical schematic diagram 700 of an alternative embodiment of an adapter for use with a dual range power supply, in accordance with the invention. The safety and filter elements shown in FIG. 6 may be present, but have been removed here for clarity. In the alternative embodiment, the adapter uses one of the AC prongs of the power supply to complete an electrical circuit, connecting the positive DC prong 412 to the positive electrode 406. The other AC prong still gets connected to the negative electrode 408 through a second receptacle slot 410. The first receptacle slot 702 is modified, and comprises a first side 704 and a second side 706, both of which are electrically conductive. The first side is electrically connected to the positive electrode 406, and the second side is electrically connected to the positive DC prong 412. When the power supply 200 is connected to the adapter, a first AC prong becomes inserted into the first receptacle slot 702, and makes contact with both the first and second sides of the receptacle slot, and thus, being electrically conductive, provides an electrical path between the positive electrode 406 and the positive DC prong 412. At the same time, a second AC prong becomes inserted into the second receptacle slot 410, thus connecting the second AC prong to the DC return of negative electrode 408.

Figure 8:
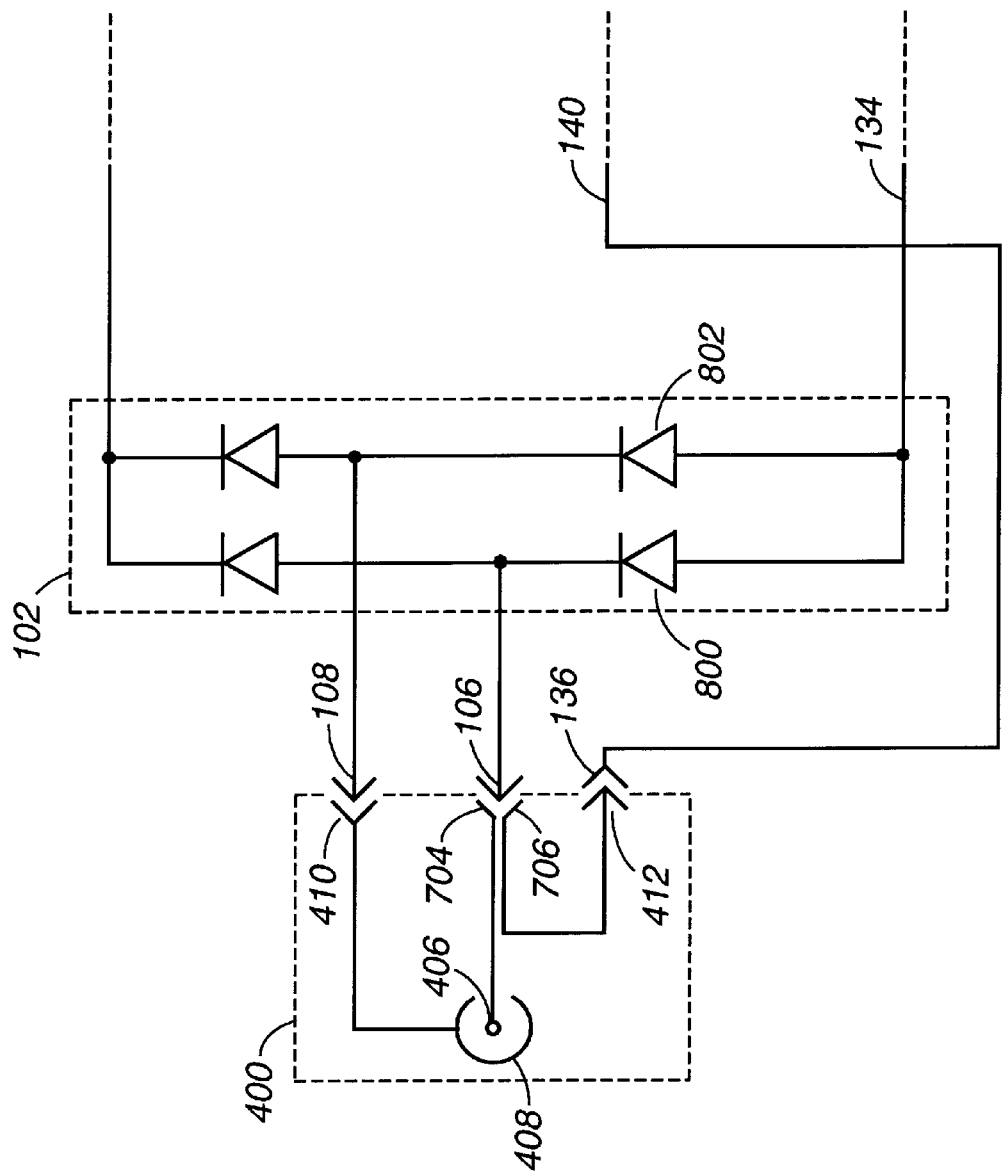
FIG. 8 shows an electrical schematic diagram of an adapter connected to a dual range power supply in accordance with an alternative embodiment of the invention.

To illustrate how the power supply and adapter function electrically, an electrical schematic diagram of an adapter connected to a dual range power supply in accordance with this alternative embodiment of the invention is shown. Referring now to FIG. 8, there is shown the input portion of the same circuit illustrated in FIG. 1, and specifically the rectifier bridge 102. The rectifier bridge is conventional, and includes a first rectifier 800 and a second rectifier 802. The first AC prong 106 is connected across the first rectifier 800, and the second AC prong 108 is connected across the second rectifier 802. In this diagram the adapter 400 is shown connected to the power supply module 200. The second AC prong 108 mates with the second receptacle slot 410 of the adapter, thus providing a return path from reference line 134, through the second rectifier and the second AC prong to the negative electrode 408. Positive DC power is supplied from the positive electrode 406 through the electrical connection formed between the first AC prong 106 and the first and second sides, 704 and 706 respectively, of the receptacle slot 702, to the positive DC prong 412 which is connected to the positive DC receptacle 136, supplying power to the DC power line 140. Power does not flow into the input of the power supply module because, by virtue of applying a positive DC voltage level to the first AC prong 106, the first rectifier 800 becomes reverse biased.

Thus, this alternative embodiment provides the adapter with a circuit so that the positive DC prong is energized only when the power supply module is plugged into the adapter.

This alternative embodiment is especially important if the adapter is designed for use with a vehicular cigarette lighter socket since, if the adapter is mounted in the socket, and the power supply is not connected to the adapter, without this alternative embodiment, the positive DC prong is energized and exposed, possibly posing a hazard. This alternative embodiment eliminates this hazard by disconnecting the positive DC prong from the positive electrode until such time as the power supply is connected to the adapter. Additionally, as the preferred embodiment is an adapter for use in a vehicular cigarette lighter socket, it would be convenient if the adapter were able to be semi-permanently mounted in the socket. Otherwise every time the power supply is removed from the adapter, the potential exists for such an action to also inadvertently remove the adapter from the socket. Therefore it is contemplated that the adapter may be provided with a cam mechanism, movable by, for example, inserting a screwdriver into an opening provided on the top of the adapter and turn the cam mechanism to engage the wall of the socket.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A dual range power supply operable from either an AC source or a DC source, comprising:
   a first AC prong and a second AC prong for connecting to the AC power source;
   a positive DC connector for operating the dual range power supply from the DC source; and
   a power supply circuit having a rectifier bridge connected to the first and second AC prongs, a DC power line coupled to the positive DC connector for supplying power to the power supply circuit, and a reference line connected to the first and second AC prongs through the rectifier bridge.

2. A dual range power supply as defined by claim 1, wherein the first and second AC prongs and the positive DC connector are located on a common face of the dual range power supply.

3. A dual range power supply as defined by claim 1, further comprising a transformer having a first primary winding for use when the dual range power supply is connected to the AC source, and a second primary winding for use when the dual range power supply is connected to the DC power source.

4. A dual range power supply as defined by claim 1, wherein the rectifier bridge comprises a first diode that is reverse biased when the dual range power supply is connected to the DC power source.

5. A dual range power supply operable with an AC source and a DC source, comprising:
   a body made of an electrically insulative material;
   a first AC prong and a second AC prong for connecting to the AC source, the first and second AC prongs located on a common face of the body;
   a positive DC receptacle for connecting to a DC source located on the common face of the body; and
   a power supply circuit having a rectifier bridge connected to the first and second AC prongs, a DC power line connected to the positive DC receptacle for supplying power to the power supply circuit, and a reference line connected to the first and second AC prongs through the rectifier bridge.

6. A dual range power supply as defined by claim 5, further comprising a transformer having a first primary winding for use when the dual range power supply is connected to the AC source, and a second primary winding for use when the dual range power supply is connected to the DC source.

7. A dual range power supply as defined by claim 5, wherein the rectifier bridge comprises a first diode that is reverse biased when the dual range power supply is connected to the DC power source.

8. An adapter for use with a dual range power supply having first and second AC prongs and a positive DC receptacle, the adapter comprising:
   a positive DC prong;
   a pair of AC receptacles;
   a negative electrode coupled to at least one of the AC receptacles; and
   wherein the AC receptacles receive the first and second AC prongs and the positive DC receptacle receives the positive DC prong upon connecting the dual range power supply to the adapter
   further comprising a positive electrode, and wherein one of the AC receptacles having a first side electrically connected to the positive electrode, a second side electrically connected to the positive DC prong, and wherein the positive DC prong becomes electrically connected to the positive electrode through the first and second sides upon connecting the dual range power supply to the adapter.

9. An adapter for use with a dual range power supply having first and second AC prongs and a positive DC receptacle, the adapter comprising:
   a positive DC prong;
   a pair of AC receptacles;
   a negative electrode coupled to at least one of the AC receptacles; and
   wherein the AC receptacles receive the first and second AC prongs and the positive DC receptacle receives the positive DC prong upon connecting the dual range power supply to the adapter
   further comprising a positive electrode, and wherein one of the AC receptacles having a first side electrically connected to the positive electrode, a second side electrically connected to the positive DC prong, and wherein the positive DC prong becomes electrically connected to the positive electrode through the first and second sides upon connecting the dual range power supply to the adapter.

10. A dual range power supply system, comprising:
    a dual range power supply comprising:
    a first AC prong and a second AC prong for connecting to the AC power source;
    a positive DC receptacle for connecting to a DC power source;
    a power supply circuit having a rectifier bridge connected to the first and second AC prongs, a DC power line connected to the positive DC receptacle for supplying power to the power supply circuit, and a reference line connected to the first and second AC prongs through the rectifier bridge;

an adapter comprising:
  a positive DC prong;
  a pair of AC receptacles;
  a negative electrode coupled to at least one of the AC receptacles; and
  wherein the AC receptacles receive the first and second AC prongs and the positive DC receptacle receives the positive DC prong upon connecting the dual range power supply to the adapter.

11. A dual range power supply system as defined in claim 10, wherein the rectifier bridge comprises a first diode that is reverse biased when the dual range power supply is connected to the DC power source.

12. A dual range power supply system as defined by claim 10, wherein the adapter further comprises:

a cylindrical body sized to fit into a vehicular cigarette socket, the negative electrode disposed on a side of the cylindrical body; and a positive electrode disposed at a bottom end of the cylindrical body.

13. A dual range power supply system as defined in claim 10, wherein the adapter further comprises a positive electrode, and wherein one of the AC receptacles having a first side electrically connected to the positive electrode, a second side electrically connected to the positive DC prong, and wherein the positive DC prong becomes electrically connected to the positive electrode through the first and second sides upon connecting the dual range power supply to the adapter.

* * * * *